United States Patent [19]

Inoda

[11] Patent Number: 4,773,734
[45] Date of Patent: Sep. 27, 1988

[54] METHOD OF FORMING HALFTONE SCREEN

[75] Inventor: Masahiro Inoda, Kanagawa, Japan

[73] Assignee: Fuji Photo Film Co., Ltd., Kanagawa, Japan

[21] Appl. No.: 14,415

[22] Filed: Feb. 13, 1987

[30] Foreign Application Priority Data

Feb. 14, 1986 [JP] Japan .................. 61-30198

[51] Int. Cl.⁴ .................. G03F 5/00; H04N 1/21; G02B 27/00
[52] U.S. Cl. .................. 350/322; 358/298; 350/321
[58] Field of Search ............ 350/322, 321; 358/283, 358/298, 280

[56] References Cited

U.S. PATENT DOCUMENTS

| | | | |
|---|---|---|---|
| 3,784,289 | 1/1974 | Wicker .................. | 350/321 |
| 4,185,304 | 1/1980 | Holladay .................. | 358/298 |
| 4,486,788 | 12/1984 | Yamada .................. | 358/298 |
| 4,543,613 | 9/1985 | Sakamoto .................. | 358/298 |

Primary Examiner—John K. Corbin
Assistant Examiner—Loha Ben
Attorney, Agent, or Firm—Sughrue, Mion, Zinn, Macpeak & Seas

[57] ABSTRACT

A halftone dot image is produced by superposing image information produced by scanning an original on a halftone screen composed of a plurality of scanning lines constituted by electrically generated halftone screen signals and arranged side by side in a direction normal to a scanning direction in which the scanning lines extend. Each of dots of the halftone screen is formed with an integral number of scanning lines commensurate with a screen angle of the halftone screen. The halftone screen signals are equalized in level at mutually corresponding areas in the respective dots.

4 Claims, 4 Drawing Sheets

METHOD OF FORMING HALFTONE SCREEN

BACKGROUND OF THE INVENTION

The present invention relates a method of forming a halftone screen, and more particularly to a halftone screen forming method which is capable, when producing a reprodceable halftone dot image by superposing an image signal generated by scanning an original bearing a continuous-tone image on an electrically generated halftone screen signal, of eliminating a periodic pattern in the halftone dot image by forming each of the dots of the halftone screen produced by the above halftone screen signal with an integral number of scanning lines commensurate with the screen angle of the halftone screen.

Recently, image scanning reading and recording apparatus are widely used in the field of printing and graphic art for electrically processing image information of originals to produce original film plates with a view to simplifying the entire process and improving the quality of printed images.

The image scanning reading and recording apparatus have been basically constructed of an input unit, a control unit, and an output unit. In the input unit, an original delivered to an image reader is scanned by a laser beam or the like, and image information of the original is converted to an electric signal representative of different intensities of reflected laser light. The photoelectrically converted image information is then processed in the control unit for tone correction, outline emphasis, or the like according to platemaking conditions. The image information which is processed by the control unit is thereafter fed to the output unit in which it is converted again to a light signal such as a laser beam. The light signal is applied to a recording medium such as a photosensitive material to record the image thereon. The image on the recording medium is then developed by a developing device, after which the recording medium is used as an original film plate.

Where an original to be printed or reproduced bears a continuous-tone image such as a photograph or a painting, it is necessary to break up the original image into halftone dots in order to reproduce tone gradations clearly. More specifically, a continuous-tone image is converted to a halftone dot image which is composed of closely spaced dots of different sizes according to gradations of density of the image. One method of breaking up a continuous-tone image into halftone dots is to apply a light signal commensurate with the continuous-tone image to a film through a contact screen having a vignetted dot pattern. The aforesaid image scanning reading and recording apparatus employ a process for electrically forming a halftone screen corresponding to such a contact screen.

One preferred example of a conventional method of forming a halftone screen will briefly be described below based on the invention disclosed in Japanese Patent Publication No. 52-49361 claiming Convention Priority based on West German Patent Application No. 1901101.9.

FIG. 1 of the accompanying drawings shows a basic periodic portion 2 of a halftone screen which is electrically formed. The halftone screen is composed of repetitions of one pattern, and the minimum unit of the halftone screen is the basic periodic portion 2. The basic periodic portion 2 is constructed of eight scanning lines S1 through S8 arranged side by side in the direction Y. Each of the scanning lines S1 through S8 forms an element of the basic periodic portion 2 with an inherent voltage signal that varies in the recording direction X. The voltages of the scanning lines S1, S2, S4, S5 passing through points A through D in a dot 4 are high, and the scanning line S3 passing through a point E is low. The voltages of the sanning lines S1 through S5 are selected to become gradually lower from the points A through D to the point E. The voltage signals or halftone screen signals of the scanning lines S1 through S8 may be produced by superposing a plurality of alternating voltage signals of triangular waveform which have different periods, and slightly shifting the phases of those voltage signals.

When converting a multicolor image or the like to dots, it is necessary to generate a plurality of halftone screens and superpose halftone dot images produced respectively by those halftone screens. In order to prevent a moire pattern from being produced when the halftone screens are superposed, the halftone screens are formed while they are rotated a prescribed angle $\theta$ with respect to the recording direction X.

The basic periodic portion 2 is periodically produced frequently enough to cover a scanned region of the original, for thereby producing a halftone screen. The halftone screen signals constituting the halftone screen are superposed on an image signal that has optically been read from the original by the input unit of the image scanning reading and recording apparatus, so that a halftone-dot image is formed on a film plate.

The halftone screen signals can sufficiently accurately represent the gradations of the halftone screen in the case where the width of each of the scanning lines S1 through S8 of the basic periodic portion 2 is sufficiently smaller than the width of the basic periodic portion 2 in the direction Y and hence the voltages of the halftone screen signals continuously vary in the direction Y. However, if the width of each of the scanning lines S1 through S8 is not negligible with respect to the width of the basic periodic portion 2 in the direction Y, the voltages of the halftone screen signals vary in a step-like discrete manner between the adjacent scanning lines S1 through S8. In such a case, the voltages at the points A through D, which are to be of maximum values, may gradually vary in the scanning lines S1, S2, S4, S5, and such a voltage variation may cause a periodic pattern to be produced in the basic periodic portion 2. Should such a periodic pattern be large enough to be visually conspicuous, an unsightly pattern, other than the gradations of the original, would be introduced into the halftone dot image as with a moire pattern.

SUMMARY OF THE INVENTION

It is a primary object of the present invention to provide a method of forming a halftone screen to produce a better halftone dot image by eliminating a periodic pattern in the halftone dot image through the formation of dots that constitute the halftone screen with an integral number of scanning lines commensurate with the screen angle of the halftone screen.

Another object of the present invention is to provide a method of forming a halftone screen in producing a halftone dot image by superposing image information produced by scanning an original on the halftone screen composed of a plurality of scanning lines constituted by electrically generated halftone screen signals and arranged side by side in a direction normal to a scanning direction in which the scanning lines extend, the method comprising the steps of forming each of the dots of the halftone screen with an integral number of scanning lines commensurate with a screen angle of the halftone screen, and equalizing the halftone screen signals in level at mutually corresponding areas in the respective dots.

Still another object of the present invention is to provide a method of forming a halftone screen, wherein the number of scanning lines is selected so as to pass through areas of the dots where the halftone screen signals are of a maximum level.

A further object of the present invention is to provide a method of forming a halftone screen, wherein the halftone screen is composed of a repeated pattern of minimum basic periodic portions, the number $\alpha$ of scanning lines which constitute each of the basic periodic portions being selected according to the following equation:

$$\frac{\gamma}{\alpha} = \frac{\tan\theta}{m(1 + \tan^2\theta)}$$

where $\theta$ is the screen angle, $\gamma$ is the number of scanning lines disposed between closest vertices of a square dot with respect to the direction normal to the scanning direction, and m is an integer.

A still further object of the present invention is to provide a method of forming a halftone screen, wherein the halftone screen is composed of a repeated pattern of minimum basic periodic portions, the number $\alpha$ of scanning lines which constitute each of the basic periodic portions being selected according to the following equation:

$$\frac{\beta}{\alpha} = \frac{1 + \tan\theta}{m(1 + \tan^2\theta)}$$

where $\theta$ is the screen angle, $\beta$ is the number of scanning lines constituting a dot, and m is an integer.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
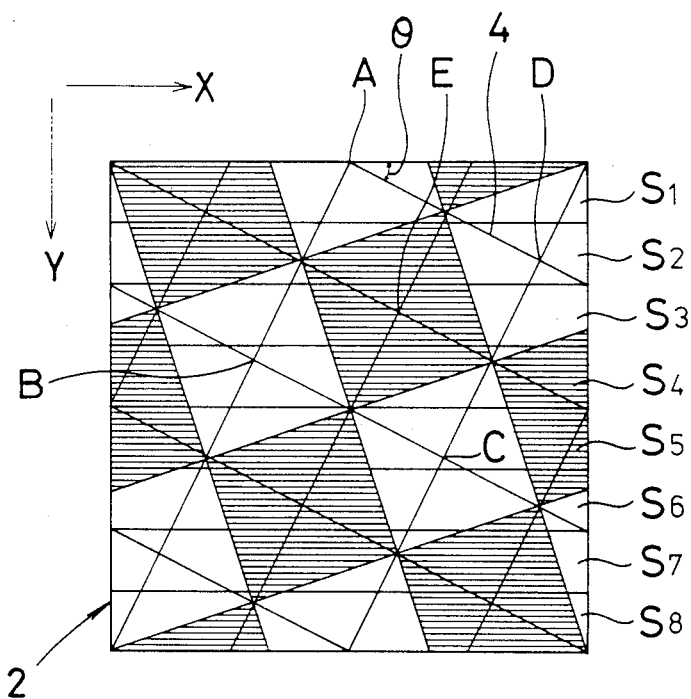
FIG. 1 is a view of a basic periodic portion of a halftone screen formed by a conventional method.
Figure 2:
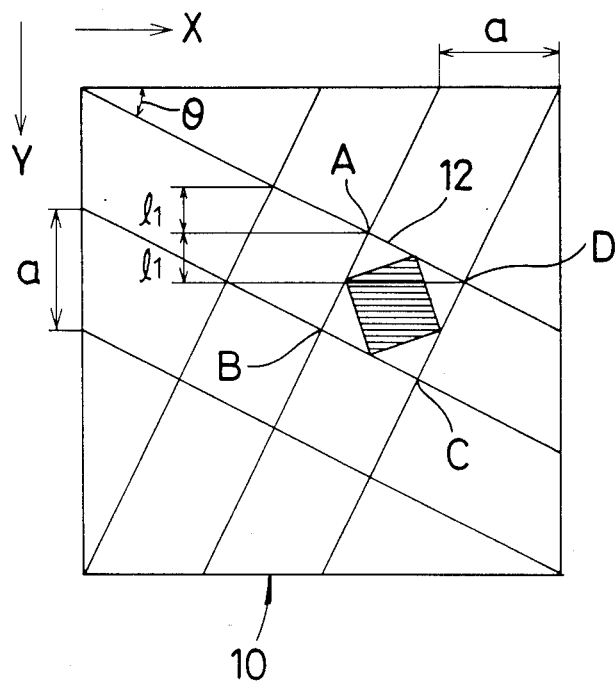
FIG. 2 is a view for explaining a method of forming a halftone screen according to the present invention.

FIG. 2 fragmentarily shows a basic periodic portion 10 of a halftone screen which is formed by electrically generating a halftone screen signal. The halftone screen is inclined at a screen angle $\theta$ in order to minimize a moire pattern that would be produced in a halftone dot image.

So as to allow the basic periodic portion 10 to be a minimum basic unit of a halftone screen constituting a halftone dot image, the screen angle $\theta$ is required to be selected as follows:

$$\tan\theta = \frac{n}{m} \quad (1)$$

where m and n are integers. Moreover, since the basic periodic portion 10 must be composed of an integral number of scanning lines arranged side by side in the direction Y, the following relationship should be met:

$$ma = \alpha P \quad (2)$$

where ma is the length of the basic periodic portion 10 in the direction Y with a being the pitch of a dot 12 surrounded by points A through D, P is the width of each of the scanning lines, and $\alpha$ is the number of the scanning lines which constitute the basic periodic portion 10.

In order that all of the adjacent dots 12 are composed of an integral number of scanning lines in the basic periodic portion 10, an integral number of scanning lines need to be disposed between the points A, D, for example. More specifically, the distance $l_1$ between the points A, D in the direction Y must be given by:

$$l_1 = \gamma P \quad (3)$$

where $\gamma$ is the number of scanning lines arranged between the points A, D. The distance $l_1$ can be expressed by:

$$l_1 = a \cos^2\theta \cdot \tan\theta \quad (4)$$

Therefore, the following equation can be derived from the equations (2), (3), and (4):

$$\frac{\gamma}{\alpha} = \frac{\tan\theta}{m(1 + \tan^2\theta)} \quad (5)$$

When the relationship (5) is established, scanning lines always pass through the points A, D where the voltage is maximum in the dot 12, and image information corresponding to these points is reproduced by halftone screen signals of the same level.

Figure 3:
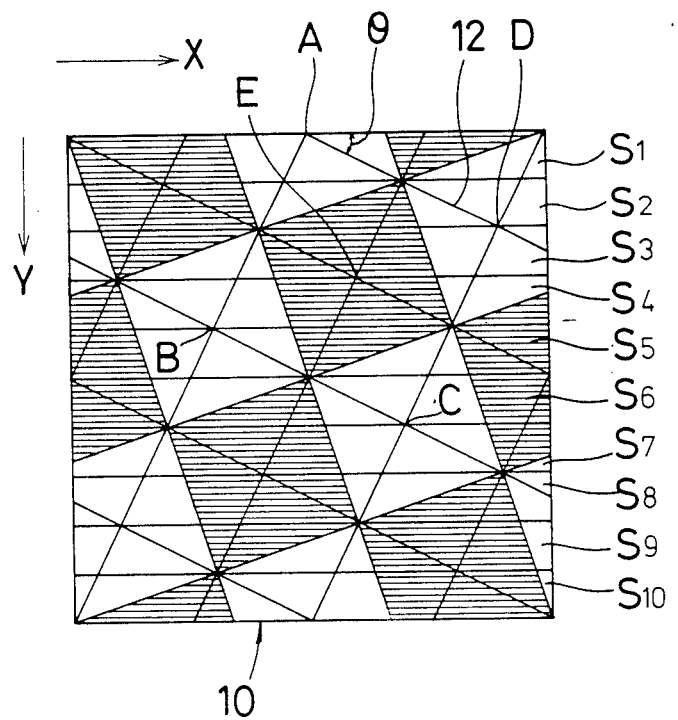
FIG. 3 is a view of a basic periodic portion of a halftone screen formed by the method of the present invention.

Likewise, image information corresponding to the points B, C is reproduced by halftone screen signals of the same level. As a result, by selecting the number of scanning lines of the halftone screen so that the equation (5) will be established, the voltages of the halftone screen signals at the points A through D are rendered constant, and hence there is no danger of a periodic pattern produced in a halftone dot image constituted by a repeated pattern of the basic periodic portion 10 shown in FIG. 2.

Where $\tan\theta$ is selected to be $\frac{1}{2}$, i.e., the screen angle $\theta$ of the halftone screen is selected to be about 27°, for example, the number of scanning lines need to be selected such that $\alpha$ is a multiple of 5 from the equation (5). In this case, therefore, no periodic pattern appears in the halftone dot image by forming the basic periodic portion 10 of ten scanning lines S1 through S10 as shown in FIG. 3.

Figure 4:
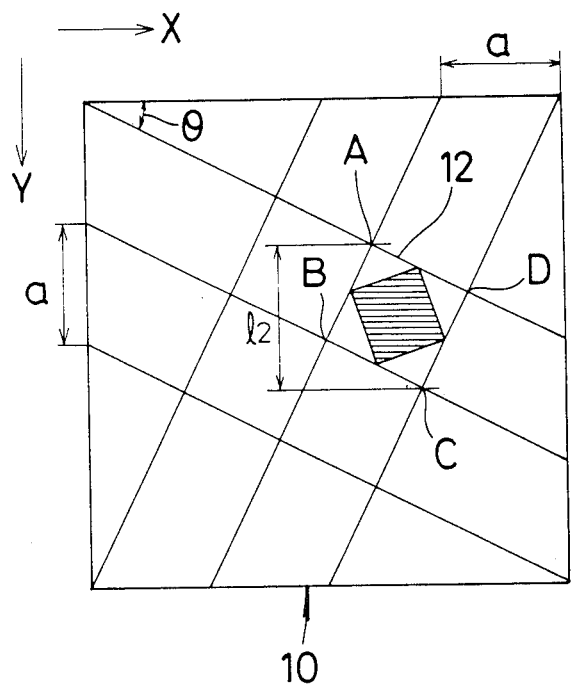
FIG. 4 is a view for explaining a method of forming a halftone screen according to another embodiment of the present invention.

In order to eliminate a periodic pattern in the basic periodic portion 10 only in the direction Y, conditions need to be established such that an integral number of scanning lines will be provided between the points A, C in a dot 12 as illustrated in FIG. 4. More specifically, the distance 12 in the direction Y between the points A, C of the dot 12 is required to be expressed by:

$$l2 = \gamma P \quad (6)$$

where $\beta$ is the number of scanning lines between the points A, C, and P is the width of each of the scanning lines, as described above. Assuming that the screen angle of the halftone screen is expressed by $\theta$, the distance 12 can be given by:

$$l2 = a \cos^2\theta(1 + \tan\theta) \quad (7)$$

Consequently, where the following equation can be derived from the equations (2), (6), and (7):

$$\frac{\beta}{\alpha} = \frac{1 + \tan\theta}{m(1 + \tan^2\theta)} \quad (8)$$

image information corresponding to the points A, C in the dot 12 is reproduced by halftone screen signals of the same level at all times. The generation of a periodic pattern in these points is therefore prevented.

Where $\tan \theta$ is selected to be 1/5, i.e., the screen angle $\theta$ of the halftone screen is selected to be about 11°, for example, and when $\alpha$ is set to a multiple of 13 from the equation (8), e.g., when a basic periodic portion 10 is constructed of 39 scanning lines, no periodic pattern is produced in the halftone dot image. In order to eliminate a periodic pattern also in the direction X, $\alpha$ is required to by set to a multiple of 26 from the equation (5) In such a case, the number of scanning lines is a multiple of 26.

With the present invention, as described above, when forming a halftone dot image by superposing an image signal produced by optically scanning an original on an electrically generated halftone screen signal, each dot constituted by the hafltone dot screen is constructed of an integral number of scanning lines commensurate with the size and angle of the halftone screen. Therefore, there is produced no portion with periodically varying dot size in a halftone dot image formed by the above halftone screen signal. As a consequence, there is no danger of a periodic pattern produced in the halftone dot image. According to the present invention, therefore, it is possible to form a clearer film plate.

Although certain preferred embodiments have been shown and described, it should be understood that many changes and modifications may be made therein without departing from the scope of the appended claims

What is claimed is:

1. A method for forming a halftone screen in producing a halftone dot image by superposing image information produced by scanning an original on the halftone screen composed of a plurality of scanning lines constituted by electrically generated halftone screen signals and arranged side by side in a direction normal to a scanning direction in which the scanning lines extend, said method comprising the steps of:
   forming each dot of said halftone screen with an integral number of scanning lines commensurate with a screen angle of the halftone screeen; and
   equalizing the halftone screen signals in level at mutually corresponding areas in the respective dots;
   wherein the halftone screen is composed of a repeated pattern of minimum basic periodic portions, the number $\alpha$ of scanning lines which constitute each of said basic periodic portions being selected on the following equation:

$$\frac{\gamma}{\alpha} = \frac{\tan\theta}{m(1 + \tan^2\theta)}$$

where $\theta$ is the screen angle, $\beta$ is the number of scanning lines disposed between closest vertexes of a square dot with respect to said direction normal to the scanning direction, and m is an integer.

2. A method according to claim 1, wherein the number of scanning lines is selected so as to pass through areas of the dots where the halftone screen signals are of a maximum level.

3. A method for forming a halftone screen in producing a halftone dot images by superposing image information produced by scanning an original on the halftone screen composed of a plurality of scanning lines constituted by electrically generated halftone screen signals and arranged side by side in a direction normal to a scanning direction in which the scanning lines extend, said method comprising the steps of:
   forming each dot of said halftone screen with an integral number of scanning lines commensurate with a screen angle of the halftone screen; and
   equalizing the halftone screen signals in level at mutually corresponding areas in the respective dots;
   wherein the halftone screen is composed of a repeated pattern of minimum basic periodic portions, the number $\alpha$ of scanning lines which constitute each of said basic periodic portions being selected on the following equation:

$$\frac{\beta}{\alpha} = \frac{1 + \tan\Theta}{m(1 + \tan^2\Theta)}$$

where $\theta$ is the screen angle, $\beta$ is the number of scanning lines constituting a dot, and m is an integer.

4. A method according to claim 3, wherein the number of scanning lines is selected so as to pass through areas of the dots where the halftone screen signals are of a maximum level.

* * * * *